United States Patent
Hayward

(10) Patent No.: US 7,646,391 B1
(45) Date of Patent: Jan. 12, 2010

(54) SYSTEMS AND METHODS FOR COLOR MANAGING CONTENT ELEMENTS ON A DISPLAY DEVICE

(75) Inventor: David Hayward, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 421 days.

(21) Appl. No.: 10/836,365

(22) Filed: Apr. 30, 2004

(51) Int. Cl.
*G09G 5/02* (2006.01)

(52) U.S. Cl. .................. 345/590; 345/589; 345/591

(58) Field of Classification Search .......... 345/589–591
See application file for complete search history.

(56) References Cited

U.S. PATENT DOCUMENTS

| | | | | |
|---|---|---|---|---|
| 5,646,752 A | * | 7/1997 | Kohler et al. | 358/520 |
| 5,909,291 A | * | 6/1999 | Myers et al. | 358/523 |
| 6,307,961 B1 | * | 10/2001 | Balonon-Rosen et al. | 382/167 |
| 6,421,142 B1 | * | 7/2002 | Lin et al. | 358/1.9 |
| 6,937,249 B2 | * | 8/2005 | Herbert et al. | 345/581 |
| 6,950,551 B2 | * | 9/2005 | Murashita et al. | 382/166 |
| 7,190,372 B2 | * | 3/2007 | Choi et al. | 345/589 |
| 2004/0004731 A1 | * | 1/2004 | Itagaki | 358/1.9 |
| 2006/0197970 A1 | * | 9/2006 | Barry et al. | 358/1.13 |
| 2008/0259092 A1 | | 10/2008 | Hayward | |

\* cited by examiner

*Primary Examiner*—Hau H Nguyen
(74) *Attorney, Agent, or Firm*—Schwegman, Lundberg & Woessner, P.C.

(57) ABSTRACT

A system and method for color managing content elements on a display device are provided. The systems and methods for color managing content elements on a display device comprising using a set of color space characteristic values that describe a color space of the display device to create a profile having a multidimensional table encapsulating the display behavior as described by color space characteristic values for the display device.

60 Claims, 8 Drawing Sheets

US 7,646,391 B1

SYSTEMS AND METHODS FOR COLOR MANAGING CONTENT ELEMENTS ON A DISPLAY DEVICE

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

TECHNICAL FIELD

Embodiments of the present invention relate generally to display devices, and more particularly to color managing content elements on display devices.

BACKGROUND

Color has the ability to communicate, to please, to excite, and to engage. For example, color makes a difference—often a dramatic difference—in photographs, graphics, layouts and the like. Getting color right early in a workflow, and keeping it right to the end, is increasingly critical in our fast-paced, deadline-driven digital world.

For each device in the workflow, the same combination of numerical color values will yield a different color. For example, a single pixel where R=128, G=128 and B=128 should produce a completely neutral gray tone. On some display devices, this gray will look warm, or reddish. On other devices it will look cool or bluish. These inherent disparities make it difficult to render the colors of an image on differing devices with consistency, accuracy and predictability. Additionally, they make it difficult to render colors of an image on a single display device over time as that display device changes over time. Furthermore, in some cases the content being displayed encompasses a set of colors beyond which the display can represent accurately. In these cases, it is important that the out-of-gamut colors be represented as faithfully as possible on the display.

Photographers, designers and more increasingly, everyday users, are frequently dismayed when they print an image and the color is wildly contrary to what was displayed on their computer screen. These disruptive surprises cost time and money and increase user frustration.

SUMMARY

Systems and methods for color managing content elements on display devices are provided. Color management profiles are created for display devices using color space characteristic values of the display device. The profile comprises multi-dimensional tables encapsulating the behavior of the display device with relation to color space characteristic values. In some embodiments, the display profile contains multiple dimensional tables that are optimized for different user environments, such as optimizing for saturation, relative calorimetric values, or perceptual display. In some embodiments, the tables are compliant with ICC Profile Specification Version 2 or 4. By using multi-dimensional tables that encapsulate the display behavior in a display profile, a color management system can more accurately and consistently perform color transformations, including in and out-of-gamut mapping.

DETAILED DESCRIPTION

The following is a detailed description of some exemplary embodiments of the invention(s) contained within the disclosed subject matter. Such invention(s) may be referred to, individually and/or collectively, herein by the term "invention" merely for convenience and without intending to voluntarily limit the scope of this application to any single invention or inventive concept if more than one is in fact disclosed. In the detailed description, reference is made to the accompanying drawings that form a part hereof, and in which are shown by way of illustration, but not of limitation, some specific embodiments of the invention, including a preferred embodiment. These embodiments are described in sufficient detail to enable those of ordinary skill in the art to understand and implement the inventive subject matter. It is to be understood that other embodiments may be utilized and that changes may be made without departing from the scope of the inventive subject matter.

This description of the embodiments is divided into three sections. In the first section, a system level overview is presented. In the second section, methods for using example embodiments are described. In the third section, an example implementation is described.

Figure 1:
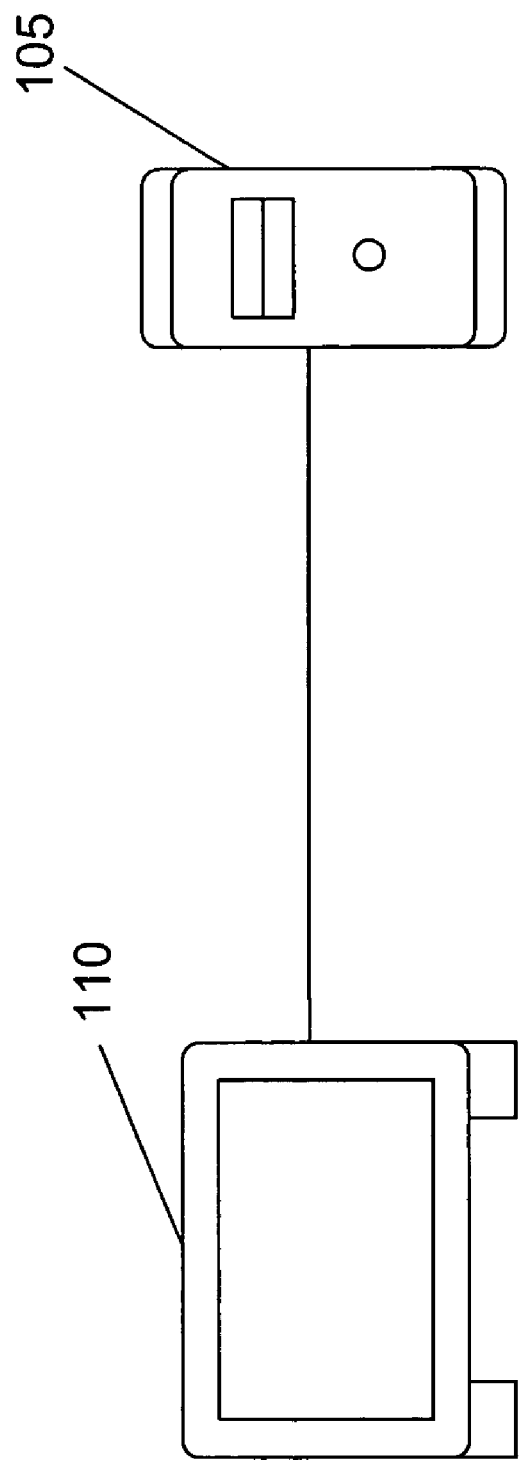
FIG. 1 is a block diagram of a hardware configuration according to an embodiment of the present invention.

System Level Overview. FIG. 1 is a simple hardware system diagram showing a computing device 105 and a display device 110. The computing device 105 sends images to be displayed on the display device 110 and receives image data from the display device 110. Images stored on the computing device 105 are acquired from a variety of other acquisition devices and are displayed on the display device 110 using the systems and methods for color managing content elements according to example embodiments of the invention.

A user of the hardware system depicted in FIG. 1 expects the colors that they perceive on their acquisition device to match the color they see on the display device 110. To accomplish this color matching, the computing device 105 transforms content from a device-independent color space or Profile Connection Space (PCS) to a device-dependent color space of the display device 110 by using a profile for the display device 110. In some embodiments, the profile comprises a multidimensional table encapsulating the display behavior.

The computing device 105 uses a set of color space characteristic values that describe a color space of the display device 110 to create the profile. In one embodiment, the color space characteristic values used to create the profile comprise chromaticity values and gamma values for the display device 110. Chromaticity values are representations of the Red, Green, and Blue (RGB) primaries of a display in a PCS coordinate system. Gamma values provide an approximate function that describes the output response of each of the RGB phosphors.

The chromaticity values and gamma values only describe the representation of in-gamut colors on the display device 110. However, the profile further describes out-of-gamut optimizations. Each display device 110 has a range of realizable colors that it can display properly. Colors that are outside of this range, or gamut, must be mapped to in-gamut values such that the color value can be displayed on the device. Embodiments of the invention are not limited to any particular method for mapping out-of-gamut values to in-gamut values. Methods of mapping out-of-gamut colors—involve optimizing the preservation of hue, saturation, or luminance when moving the color from out-of-gamut to in-gamut. In some embodiments, the preservation of hue is a primary consideration with saturation and luminance being a secondary consideration in the mapping of out-of-gamut colors. However, any methods for handling out-of-gamut colors may be used with the profile.

The computing device 105 automatically generates the profile for the display device 110 using the color space characteristic values for the display device 110. In one embodiment, when the display device 110 is connected to the computing device 105, the computing device 105 queries the display device 110 for a set of data that describes its characteristic color space. The computing device 105 then creates and stores a profile using the set of color space characteristic values for the display device 110. This process is referred to as calibrating a display.

In an embodiment, any event that triggers a calibration is a re-calibration event. Re-calibration events include, without limitation, first starting a computing device 105, connecting a new display device 110 to the computing device 105, rebooting of a computing device 105, and a user-initiated session to further define the profile of the display device 110.

Figure 2A:
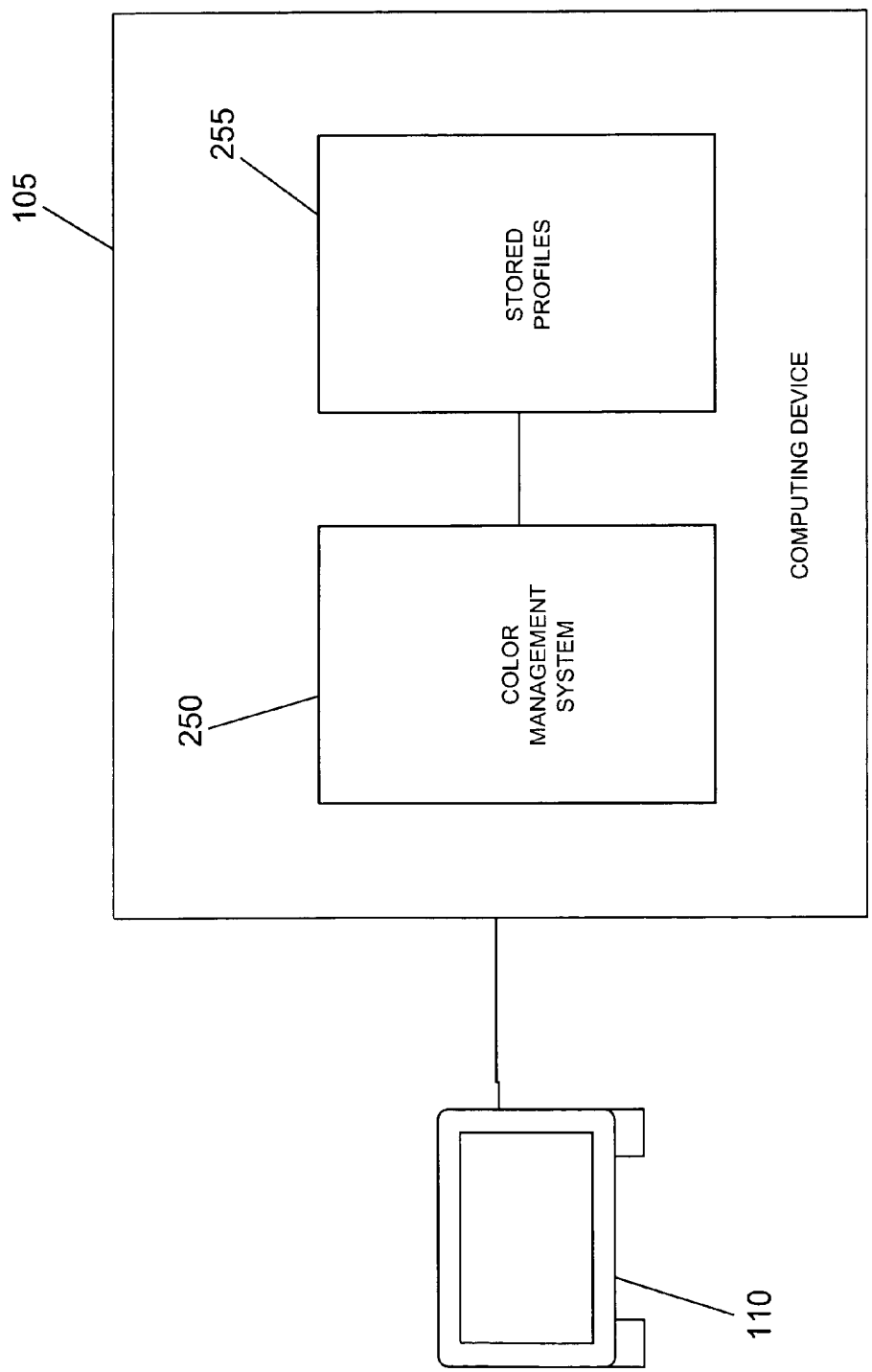
FIG. 2A is a block diagram of a color management system according to an embodiment of the present invention.

FIG. 2A is a block diagram describing a system according to an embodiment of the present invention. The system shown in FIG. 2A comprises a computing device 105 connected to a display device 110. The computing device 105 includes a Color Management System 250 and stored profiles 255.

The Color Management System (also referred to herein as "CMS") 250 performs color transformations by connecting a source color space to a destination color space through the PCS. For example, the CMS 250 performs a transformation from the color space of a scanner device to the color space of the display device through the PCS.

The stored profiles 255 provide the color management system shown in FIG. 2A with the information used to convert color data between native device color spaces and device-independent color spaces. For converting from device-independent color spaces to native device color spaces, one or more of the stored profiles has a multidimensional table encapsulating the display behavior as described by the color space characteristic values of the display device 110. This includes both in-gamut mapping and out-of-gamut mapping optimizations.

In one embodiment, the stored profiles 255 conform to the International Color Consortium (ICC) profile specification and the multi-dimensional table is a data structure referred to in the ICC Specification as a "BtoA tag." ICC profiles are a cross platform file format that defines the data required for calculating a color match between devices or between working color spaces. Each ICC profile can contain device-dependent data (i.e. unique combinations of RGB values) or device-independent data. The device-independent data may also be called the Profile Connection Space (also referred to here in as "PCS"). In an embodiment, ICC profile includes an ICC profile compliant with ICC Version 2 which may contain 8 bit (mft1) and 16 bit (mft2) information. In a further embodiment, ICC profile includes an ICC profile compliant with ICC Version 4 which may contain a 16 bit (mba) information. However, embodiments of the invention are not limited to the ICC profile specification. Any file or data structure for color management is considered within the scope of the term profile.

Figure 2B:
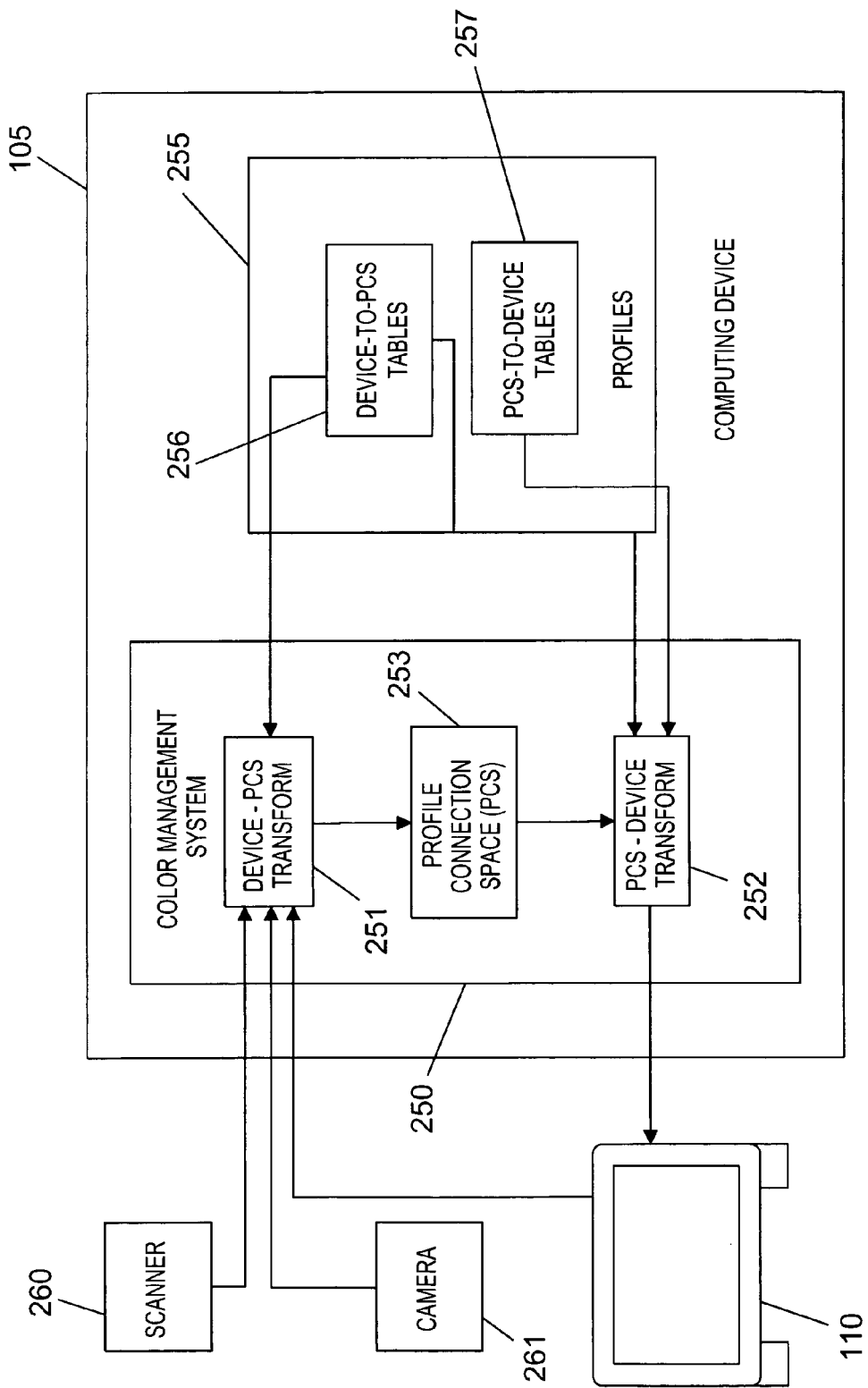
FIG. 2B is a functional block diagram of a color management system according to an embodiment of the present invention.

FIG. 2B is a functional block diagram describing in more detail the color management system described with respect to FIG. 2A. The CMS 250 has instructions contained therein to perform both a Device-to-PCS transform 251 and a PCS-to-Device transform 252. The stored profiles include both Device-to-PCS 256 and PCS-to-Device 257 tables that can be referenced by the CMS 250.

In an embodiment, every item that is acquired is transformed by the CMS 250 using a Device-to-PCS 251 transform referencing the profile of the acquisition device which is stored in the stored profiles 255 contained on the computing device 105. Each of these profiles contains appropriate tables for the actions that can be performed by the acquisition device. With respect to a scanner 260 only information to properly transform the color characteristics of acquired items from the scanner-dependent color space to a device-independent color space or PCS 253 needs to be maintained. With respect to a display device 110, items may be both input from and output to them. A user may modify an item on screen and given the color space characteristic values of the display device 110, the CMS 250 can perform a Device-to-PCS transform 251 on the item to arrive at the device-independent PCS 253. In displaying an item on the display device 110, the CMS 250 performs a PCS-to-Device transform 252 to transform the color space of the item from the PCS 253 to that of the display device 110. In order to perform these transforms, the CMS 250 can reference both the Device-to-PCS tables 256 and the PCS-to-Device tables 257 contained in the profile associated with the display device 110.

It is to be understood that though the simple term "acquiring an item" from the display device 110 is used, the actual input of an image on a display device 110 can be more complex. During display and modification, the PCS-to-Device Transform 252 must transform every piece of color information. The user on altering the image by use of any input device is changing the display of the image. The user's input must be transformed using the Device-to-PCS transform 251 taking into account how the user wants the item displayed and the display characteristics of the display device 110.

In operation, the system shown in FIG. 2B automatically generates a default profile for a display device 110 using a set of color space characteristic values for the display device 110. The default profile having a multidimensional table encapsulating the display behavior (such as a BtoA tag) provides improved color accuracy including better mapping of out-of-gamut colors into the display device's color space. In one embodiment, a BtoA tag contains a three-dimensional lookup table to map PCS values to display device RGB values. The tag is generated algorithmically based upon standard display color space characteristic values. For out-of-gamut PCS values, the three-dimensional lookup table contains device RGB values that best preserve the color's hue, saturation, and luminance.

In contrast to the improved system shown in FIG. 2B, existing color management systems generate a simple profile for a display device such as a matrix profile as defined by the ICC specification. In general, the matrix profile is simple, creates a smaller profile and provides faster processing. Also, matrix profiles include values that closely correspond to the color space characteristic values obtained from the display device and little additional processing is required to generate the matrix profile. That is because the values received from the device are the same values used in the matrix profiles. No additional processing is done to create out-of-gamut mapping optimizations. Thus, there is little flexibility with matrix profiles to handle out-of-gamut mapping. In part, this is because when using a matrix profile to convert device-independent colors to device RGB, the ICC profile specification defines that if the source color lies outside the gamut of the destination, the result is clipped in a simple fashion to yield in-gamut device values. Compared to matrix profiles, the multidimensional table profiles (such as profiles using BtoA tags) can result in very large profiles in some embodiments of the invention. Profiles that contain BtoA tags can be several hundred kilobytes to over a megabyte. However, the multidimensional table profiles are more flexible and can model any device to a certain amount of high accuracy (including mapping out-of gamut values to in-gamut values) depending on the algorithms used.

Figure 3:
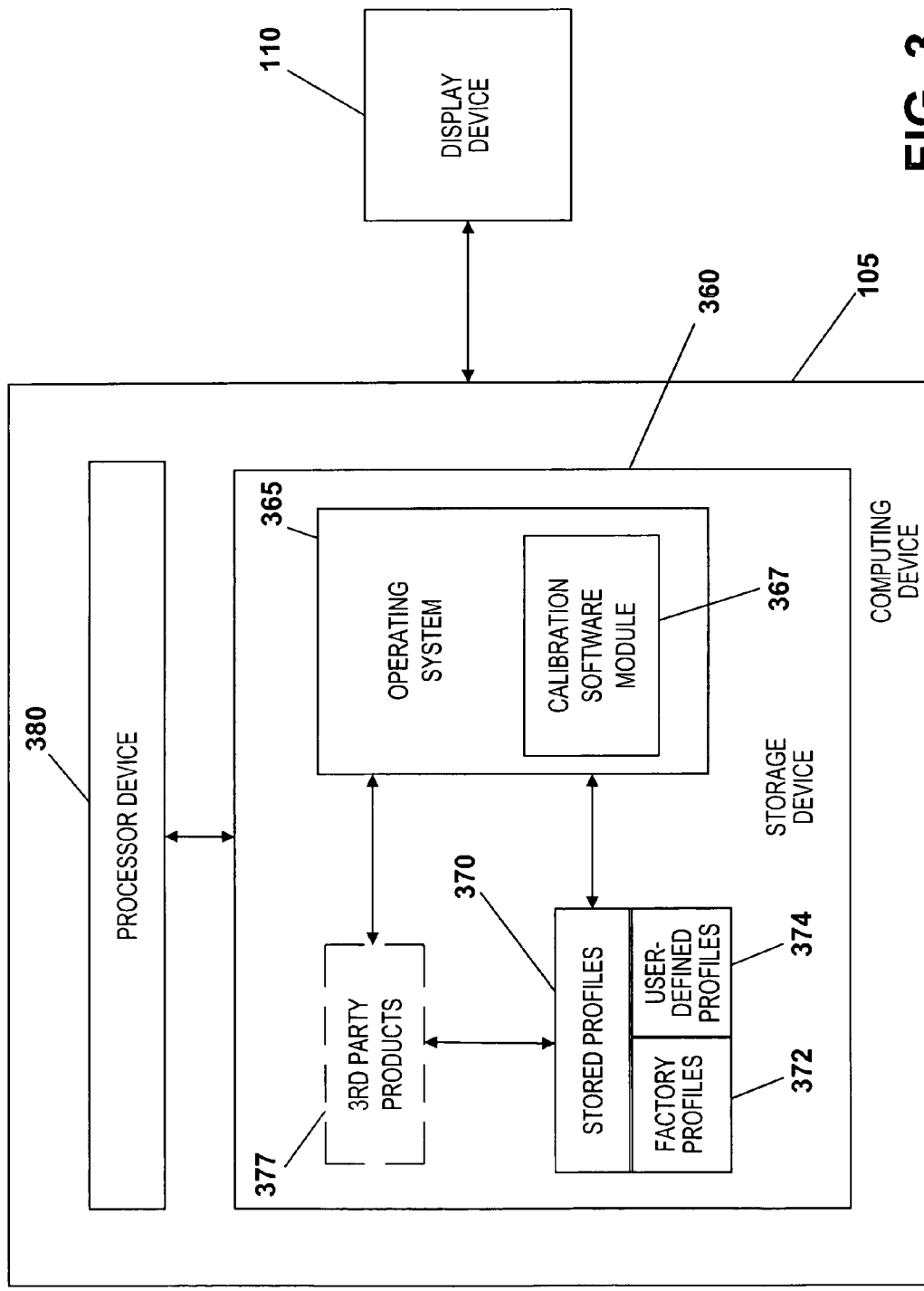
FIG. 3 is a diagram of a system for the implementing color management according to an embodiment of the present invention.

FIG. 3 is a diagram of a system for implementing the system of color management described above with respect to FIG. 2A and FIG. 2B. The computing device 105 further comprises a storage device 360 and a processor device 380. The processor device 380 executes instructions stored on the storage device 360, such as instructions for an operating system 365. In an alternate embodiment, the processor device 380 is a graphics processor for executing graphics instructions and may optionally be integrated with a video card. In an embodiment, the operating system 365 includes a Calibration Software Module 367. In another embodiment, the Calibration Software Module 367 is a Color Management System as contemplated by the ICC Specification. The storage device 360 contains stored profiles 370 for input and output devices. The stored profiles 370 may either be a factory profile 372 or a user-defined profile 374. A factory profile 372 is a device manufacture supplied profile for that device. By studying the average device behavior of a number of manufactured devices the manufacturer can create a factory profile 372 for the device. User-defined profiles 374 are profiles that have been designed by either querying the user as to the input or output of items with respect to the user's expectations. In an embodiment, user-defined profiles 374 further include any modification of the factory profile 372, whether the modification is user-initiated or not.

In addition to a Calibration Software Module 367 contained in the Operating System 365 instructions, the storage device may contain other calibration software modules, referred to as $3^{rd}$ Party Calibration Modules 377, either pre-installed on the storage device or installed on the storage device after delivery to a user. $3^{rd}$ Party Calibration Modules 377 can perform substantially the same functions as the Calibration Software Module 367 or some sub-set of functionality. For example, a $3^{rd}$ Party Calibration Module 377 may perform calibration functionality only with respect to a specific hardware device connected to the computing device 105. Though the $3^{rd}$ Party Calibration Module 377 is depicted as a software module on the storage device, it is to be understood that such module may be hardware based and connected to the computing device 105 totally separate from the storage device. In such an example, the hardware based $3^{rd}$ Party Calibration Module 377 may itself contain instructions for performing calibration instructions.

In an embodiment, the processor device 380 and the storage device 360 are in the same physical enclosure as the display device 110. Such an arrangement may be called an all-in-one unit. Other realizations of such an arrangement include, without limitation, laptop computers, cellular telephones, portable audio players and personal digital assistants (PDA's). In an alternate embodiment, the display device 110 is enclosed separately from the computing device 110. This is a traditional desktop computer arrangement where the display is separate from the computer itself. It also includes any other arrangement where the computing device 105 is physically separate, though connected by a cable, from the display device 110. Such arrangements include, without limitation, traditional desktop computers (including desktop computers provide output to a television as a second or alternate display) and set-top boxes connected to televisions.

Methods. In this section, particular methods of example embodiments are described by reference to a series of flow charts. The methods to be performed constitute computer programs made up of computer-executable instructions. FIGS. 4A TO 6 describe methods for building a device profile according to some example embodiments.

FIG. 4A to FIG. 6 present methods of using the systems described above with respect to FIG. 1 to FIG. 3 according to embodiments of the present invention.

Figure 4A:
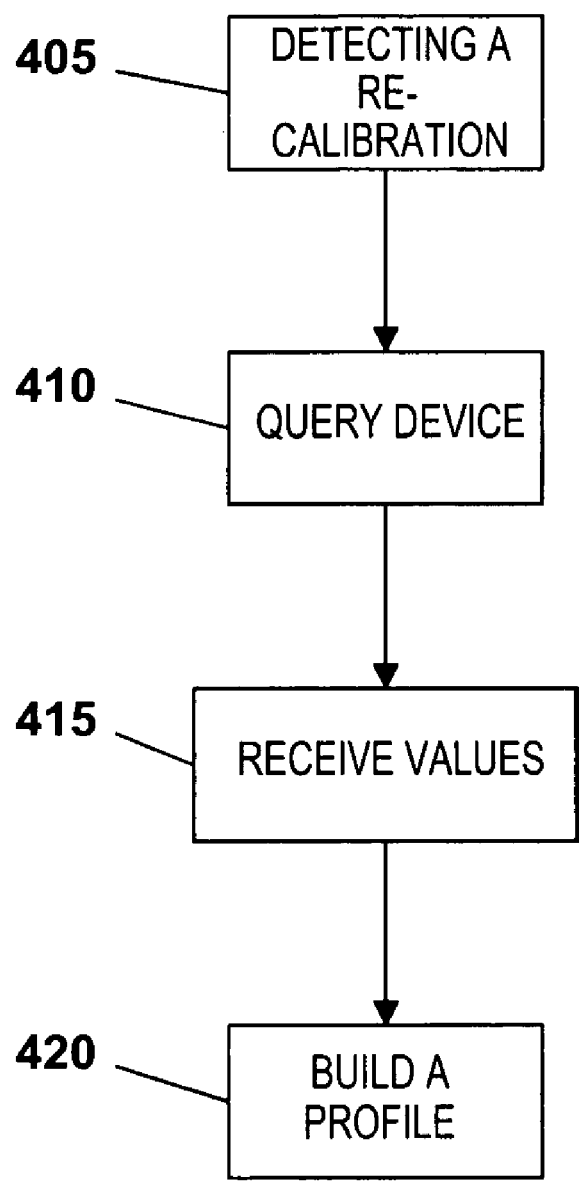
FIG. 4A is a method of building a color management profile for a display device according to an embodiment of the present invention.

FIG. 4A depicts a method of building a profile for a display device 110 according to an embodiment of the present invention. At 405 the computing device 105 detects some re-calibration event. Re-calibration events include, without limitation, first starting the computing device 105, powering on the display device 110, re-starting the computing device 105 and user-initiated calibration sessions.

At 410 the computing device 105 queries the display for a set of data defining the color space characteristics of that display device 110. In an embodiment, the display device 110 communicates Extended Display Information Data (EDID) to the computing device 105. In another embodiment, the display device 110 communicates a set of data defining the color space characteristics of that display device 110 over any suitable communications protocol. Suitable communications protocols include, without limitation, Universal Serial Bus (USB), Digital Video Interface (DVI) and Apple Display Connector (ADC). In an alternate embodiment, the color space characteristics of a display device 110 are obtained from a factory profile (or any other matrix profile) previously stored on the storage device of the computing device 105 rather than from the display device 110 itself. In another embodiment, querying further comprises receiving user input as to the display behavior of the display device 110 such that the information contains user-preferred characteristics.

At 415 the computing device 105 receives the values from the display device 110. In an embodiment, the values received from the display device 110 are in matrix format and contain minimal data. In another embodiment, receiving further comprises receiving input from a user as to the perceived display behavior of the display device 110.

At 420 the computing device 105 builds a profile based on the values received from the display device 110 or from a user. In an embodiment, at 420 the computing device 105 builds a profile based on the values received from the display device 110 after the computing device 105 first converts the matrix based data to a multi-dimensional table. In an alternate embodiment, the computing device 105 stores only those values and does not store a profile for the display device 110. In yet another embodiment, the computing device 105 stores those values in the appropriate display device profile and converts them to a multi-dimensional table upon every display event. In still another embodiment, the computing device 105 builds the profile by augmenting an existing matrix profile to include mappings for out-of-gamut colors to in-gamut colors.

Use of a multi-dimensional table may be computationally costly and it may be advantageous to use the simpler matrix-based profile in some situations. In an embodiment, the computing device 105 builds a profile that is based on the capabilities of the system or the content to be displayed. A determination as to the capabilities of the system could be based on any of the following, without limitation, CPU speed, CPU type, presence of a video card, suitability of the video card, amount of memory, amount of video memory and the storage space available on the storage device. A determination based on the content to be displayed could be based on any of the following, without limitation, out-of-gamut values in the content and out-of-gamut values in the source profile. In a further embodiment, matrix-based information and multi-dimensional based information on the display characteristics of a display device are stored in a single display profile. In such an embodiment, the computing device 105 determines at the time of a display event whether to use the matrix-based profile information or the multi-dimensional profile information to transform from PCS to the device-dependent color characteristic values of the display device 110 based on either the system capabilities or the content to be displayed.

Figure 4B:
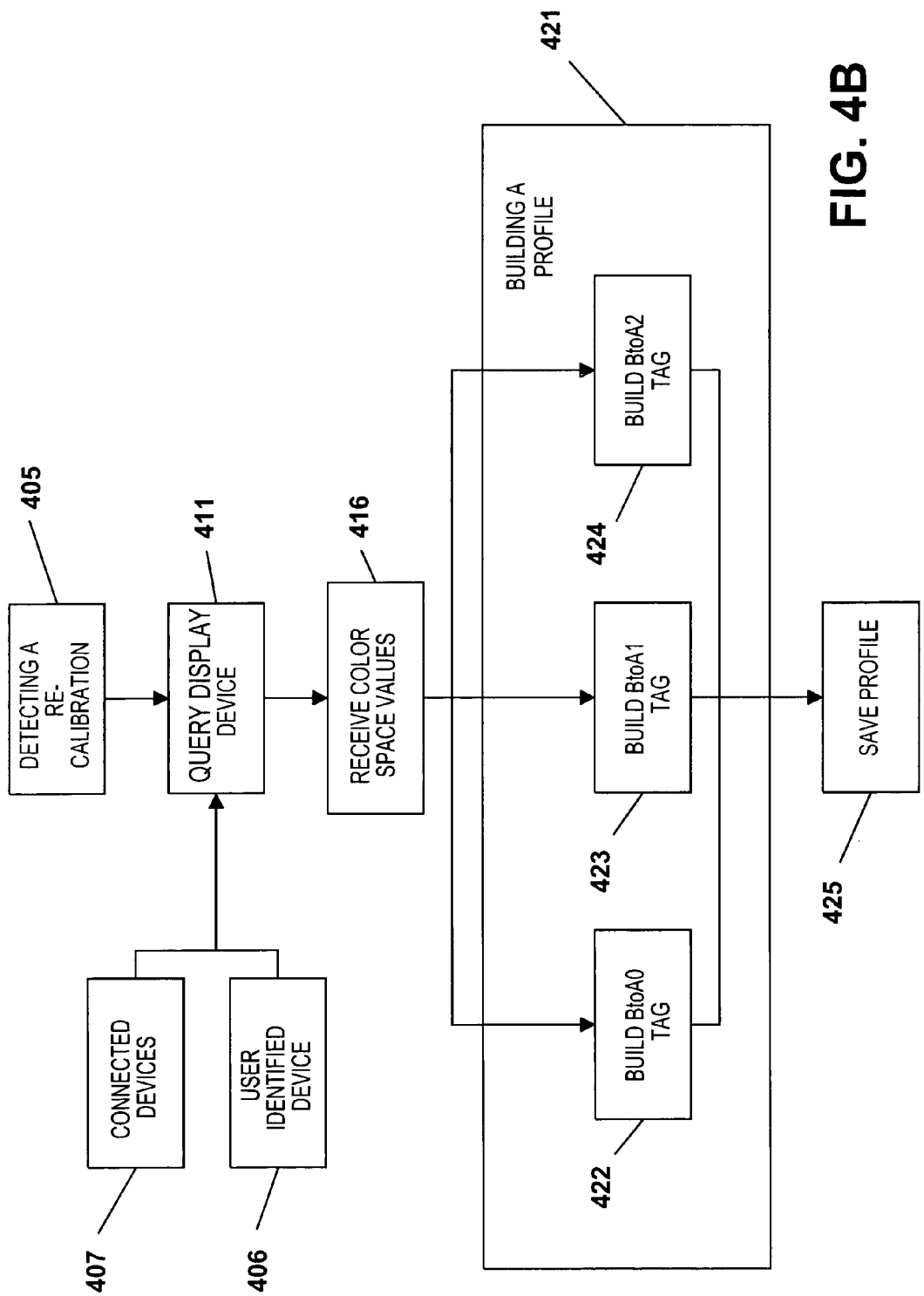
FIG. 4B is a method of building a color management profile for a display device according to an embodiment of the present invention.

FIG. 4B depicts a method of building a profile for a display device 110 according to an embodiment of the present invention. At 405 the computing device 105 detects some re-calibration event, as described above with respect to FIG. 4A. At 411 the computing device 105 queries the display device 110. In an embodiment, the display device 110 includes all connected display device 110s 407, such as might be queried when the computing device 105 is first started. In an embodiment, the display device 110 includes a display device 110 identified by a user, such as when a user has initiated a calibration session. At 416 the computing device 105 receives color space characteristic values from the at least one display device 110. In an embodiment, the received color space characteristic values are in a matrix-based format containing minimal information.

At 421 at least one BtoA tag is built using the received color space characteristic values. In an embodiment, the BtoA tag is built by converting the matrix based color space characteristic values to a multi-dimensional table. In an embodiment building a BtoA tag comprises building a BtoA0 tag 422, building a BtoA1 tag and building a BtoA2 tag. BtoA0 tags are tags that optimize color management for a perceptual rendering intent. BtoA1 tags are tags that optimize color management for out-of-gamut colors of the display device 110, or relative calorimetric intent. BtoA2 tags are tags that optimize color management in order to maximize saturation intent. In an alternate embodiment, only one BtoAx tag is built, wherein the letter x is used to denote either 0, 1 or 2. In an embodiment, at 425 the tag is saved in the profile associated with the display device 110. In an alternate embodiment, at 425 the tag is saved on the storage device 340 and a profile is created whenever needed. In a further embodiment, the received color space characteristic values are saved to the storage device and the at least one BtoAx tag is created whenever needed.

Figure 5:
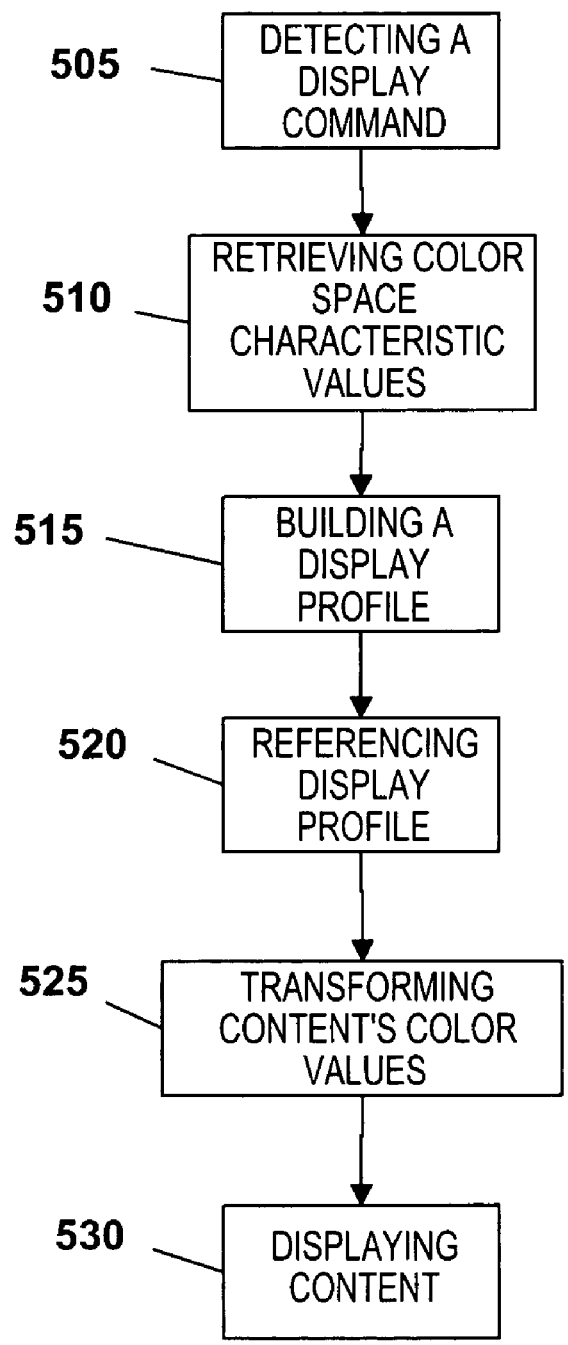
FIG. 5 is a method of displaying color-managed content on a display device according to an embodiment of the present invention.

FIG. 5 is a method of displaying color-managed content on a display device 110 according to another embodiment of the present invention. At 505 a computing device 105 detects a command to display some content element. At 510, the computing device 105, using a CMS 250, retrieves color space characteristic values for the display device. In an alternate embodiment, the color space characteristic values are obtained from an existing matrix profile for the display device rather than by querying the device after detection of a command to display content. In still another embodiment, the color space characteristic values are obtained from a database or other local storage. In yet another embodiment, the color space characteristic values are downloaded from a remote server such as a server on an Intranet or Internet. At 515, the CMS 250 builds a display profile using the color space characteristic values wherein the display profile contains a multi-dimensional table encapsulating the display device's behavior. In an embodiment, the multi-dimensional table is an ICC compliant BtoA tag. In an embodiment, the multi-dimensional table is an ICC compliant BtoAx tag, wherein the letter x is used to denote either 0, 1 or 2. In one embodiment, his display profile is built upon every display event. In a further embodiment, the display profile is created periodically separate from display events. At 520 the CMS 250 references the just built display profile and transforms the color values for the content element using the display profile at 525. At 530 the computing device 105 displays the now transformed content element on the display device 110.

Figure 6:
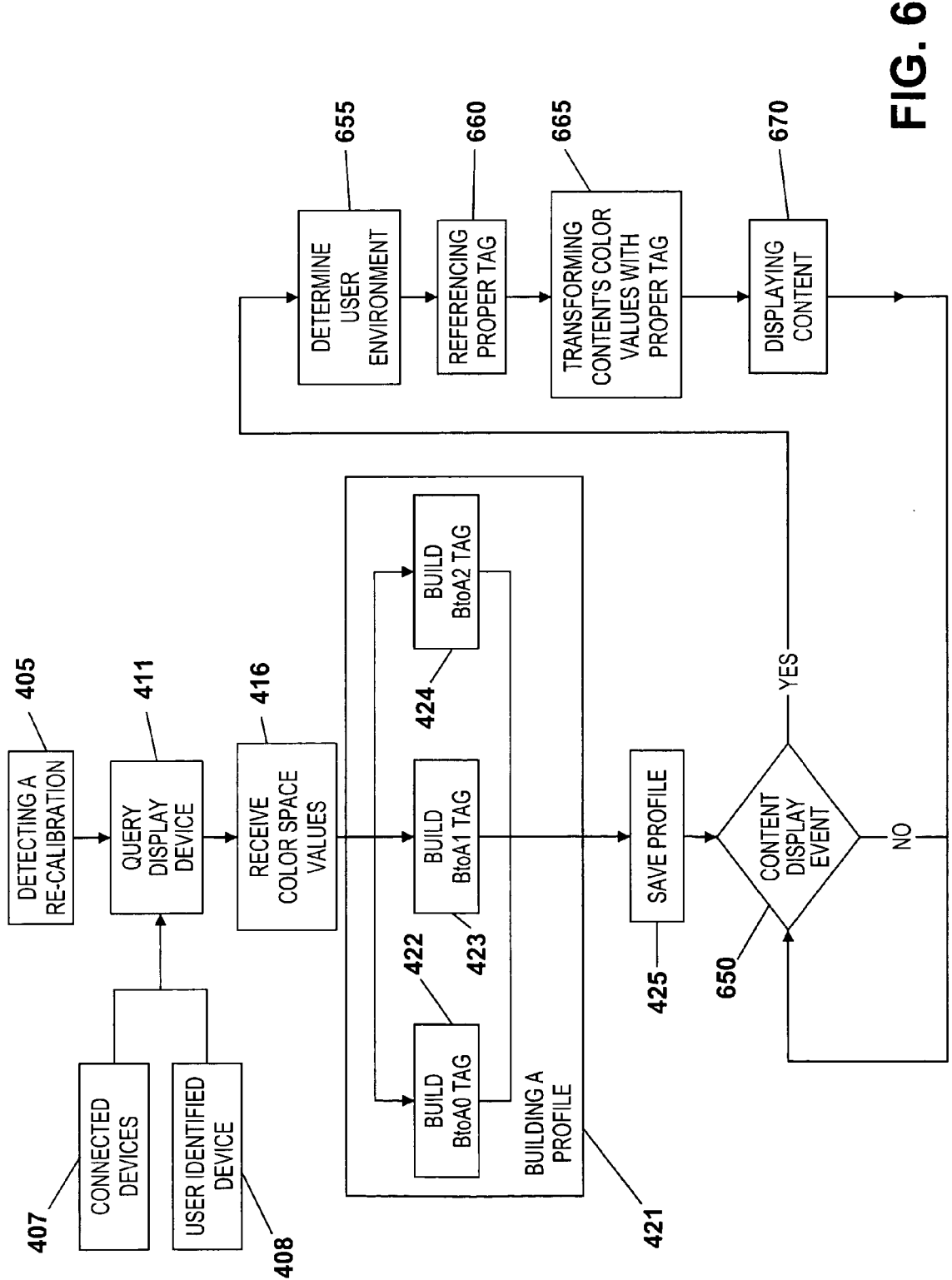
FIG. 6 is a method of color managing a display device according to an embodiment of the present invention.

FIG. 6 depicts a method for color managing a display device 110 according to an embodiment of the present invention. FIG. 6 incorporates the building of a color management profile as depicted in FIGS. 6A and 6B and the displaying of color-managed content depicted in FIGS. 5A and 5B. At 405 the computing device 105 detects a re-calibration event such as those described above with respect to FIG. 6A. At 411 the computing device 105 queries the display device 110 for a set of data, such as color space characteristic values. The devices queried may be the all the connected devices 407 or a user-identified device 608. At 416 the computing device 105 receives color space characteristic values from the display device 110. Based on the received values, the computing device 105 can build a number for BtoA tags at 421. Each BtoA tag is optimized for a different type of color management intent, as described above with respect to FIG. 6B. At 425 the number of BtoA tags are saved. In an embodiment, the number of BtoA tags are saved within a profile associated with that device. In an embodiment, the number of BtoA tags are saved separately and a profile created whenever needed. In a further embodiment, the received color space characteristic values are saved directly to the associated profile and BtoA tags are built whenever needed.

Following the creation or modification of the profile for the display device 110, the computing device 105 waits for some content display event at 650. Upon detecting a content display event at 650 the computing device 105 determines the user environment at 655. In an embodiment, the user environment includes environments where the display of content elements can be differently color managed based on that environment. In an embodiment, the user environment may be defined as whether the user is home or at work, whether their laptop is running on a charger or on the battery. In another embodiment, environmental sensors connected to the computing device 105 define the user environment. At 660 the computing device 105 references a tag contained in the profile for the display device 110 that is associated with the user environment the computing device 105 is currently in. At 665 the computing device 105 transforms the content's color values with that proper tag to color manage the content on the display device 110. At 520 the content is displayed on the display device 110 and the system returns to 650 to wait for the detection of further content display events.

These methods and systems are general examples of carrying out embodiments of the present invention. In the next section, an exemplary implementation of the methods and systems described above will be presented.

Example Implementations. On an operating system such as Apple's Mac OS X, color management is an important module in providing consistent color to the end user. Described above were methods and systems of color managing content. In this section, an implementation of such methods and systems will be discussed with relation to Mac OS X and its Calibration Software Module, ColorSync.

When a display is connected to a computer running Mac OS X, it communicates industry standard Extended Display Identification Data (EDID) to Mac OS X. In alternative embodiments, any suitable communications protocol can be used to communicate data from the display to a computer running Mac OS X. This data is matrix-based data and contains no more then 9 values to define its color characteristic space. Color Sync running on Mac OS X automatically creates a profile that reflects how the display shipped from the factory based on that data. In an embodiment, ColorSync takes this matrix-based data and converts it to a multi-dimensional table containing much more information on gamut mapping optimizations and stores the multi-dimensional table in the profile. Converting the matrix-based data to a multi-dimensional table is computationally costly. In a further embodiment, ColorSync stores the matrix-based data and only converts it to a multi-dimensional table when a content display event occurs. A profile with the multi-dimensional table of a BtoA tag contained is several times larger in file size then simple matrix based data.

Upon every content display event, ColorSync applies the profile of the display device to every content item that will display on it. This includes not only actual pictures, but also every piece of content that has some color value. ColorSync transforms each of these item's colors with that display device's profile. Without transforming each piece of content, a user may see something that is supposed to be black display in one area of their screen as perfect black, but in another area, it displays as a very dark grey. Given the amount of information that is conveyed to the user with the use of color, such a disparity is unacceptable.

In addition to displaying colors that are well within the gamut of a display device, ColorSync provides for a mapping optimization from out-of-gamut colors to in-gamut colors. This is provided for by the use of the BtoA tags, or multi-dimensional tables. Use of just the matrix-based data provides very little guidance to the Color Management Module on out-of-gamut mapping optimizations. The use of a BtoA tag contained in the device profile provides to Mac OS X, and in turn to the user, a consistent representation of colors that they can rely on time and again. Using a tag contained in a profile that is many times greater then is typically used presents an extremely large computational cost when every item with color that is displayed on the screen must be transformed with relation to that tag.

Practically every software application running on a computing device that displays content elements to a display device uses color elements. With respect to Mac OS X, these software applications include, without limitation, iPhoto for the display and organization of photo images, iMovie for the creation of movies, iTunes for the organization of music files including representations of album cover art, Mail for the receiving and sending of email messages which can contain color content, Safari for the retrieval and display of web pages and iChat for video conferencing between users. Each of these software applications uses color in significant ways. iChat for conveying the thread of a conversation visually. Mail for the highlighting of message threads. iPhoto for the displaying of photos. Proper color management of the content elements in these software applications ensures that the end user is properly cued as to the operation of the application.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method of calibrating a display device, comprising:
   detecting a re-calibration event;
   in response to the re-calibration event querying a display device for a set of color space characteristic values that describe the color space of the display device, the display device having a screen to display content;
   receiving the set of color space characteristic values from the display device; and
   building a profile for the display device using the set of color space characteristics by converting a matrix-based format of the set of color space characteristics to a multidimensional table, the multidimensional table being different from a matrix, the multidimensional table containing more information on gamut mapping than the matrix-based format, wherein the profile comprises:
   the multidimensional table encapsulating display behavior as described by the color space characteristic values, the multidimensional table including values for the display device to preserve a color's hue for out-of-gamut mapping for displaying the content on the screen; and
   out-of-gamut mapping optimizations.

2. The method of claim 1, wherein the color space characteristic values comprises chromaticity values and gamma values.

3. The method of claim 1, wherein the building a profile includes building a profile that conforms to the International Color Consortium (ICC) profile specification.

4. The method of claim 3, wherein the multi-dimensional table includes a BtoA tag as described by the ICC profile specification.

5. The method of claim 1, wherein detecting a re-calibration event includes starting a computing device.

6. The method of claim 1, wherein detecting a re-calibration event includes restarting a computing device.

7. The method of claim 1, wherein detecting a re-calibration event includes connecting a display device to a computing device.

8. The method of claim 1, wherein detecting a re-calibration event includes detecting a user-initiated command to calibrate a display device.

9. The method of claim 1, wherein querying the device includes prompting the user for a set of inputs.

10. A method of color managing content elements on a display device comprising automatically creating a profile by converting a matrix-based format of a set of color space characteristic values that describe a color space of the display device to a multidimensional table, the multidimensional table being different from a matrix, the multidimensional table containing more information on gamut mapping than the matrix-based format, the display device having a screen to display the content elements, the multidimensional table encapsulating display behavior as described by color space characteristic values for the display device in order to optimize mapping of out-of-gamut colors to in-gamut colors for displaying the content on the screen, the multidimensional table including values for the display device to preserve a color's hue for out-of-gamut mapping.

11. The method of claim 10, wherein the color space characteristic values comprises chromaticity coordinates.

12. The method of claim 11, wherein the color space characteristic values further comprise one or more gamma values.

13. The method of claim 12, the profile conforms to the International Color Consortium (ICC) profile specification.

14. The method of claim 13, wherein the multi-dimensional table includes a BtoA tag as described by the ICC profile specification.

15. A computer readable storage medium containing instructions, which when executed by a processor device, cause operations to be performed which comprise:
   obtaining a set of color space characteristic values for a display device, the display device having a screen to display content;
   automatically building a profile using the set of color space characteristic values for the display device by converting a matrix-based format of the set of color space characteristics to a multidimensional table, the multidimensional table being different from a matrix, the multidimensional table containing more information on gamut mapping than the matrix-based format, wherein the profile comprises:
      the multidimensional table encapsulating display behavior as described by the color space characteristic values, the multidimensional table including values for the display device to preserve a color's hue for out-of-gamut mapping for displaying the content on the screen; and
      out-of-gamut mapping optimizations.

16. The computer readable storage medium of claim 15, wherein the color space characteristic values comprises chromaticity values.

17. The computer readable storage medium of claim 15, wherein the color space characteristic values further comprise one or more gamma values.

18. The computer readable storage medium of claim 15, wherein the profile conforms to the International Color Consortium (ICC) profile specification.

19. The computer readable storage medium of claim 15, wherein the multi-dimensional table includes a BtoA tag as described by the ICC profile specification.

20. A computer readable storage medium containing instructions, which when executed by a processor device, cause operations to be performed which comprise:
   obtaining a set of color space characteristic values for a display device, the display device having a screen to display content; and
   building a profile using the set of color space characteristic values for the display device, wherein the profile comprises a BtoA tag, the BtoA tag including a multidimensional table having values for the display device to preserve a color's hue for out-of-gamut mapping for displaying the content on the screen, the multidimensional table being different from a matrix and being substantially larger in file size than a matrix-based format for the set of color space characteristic values, the multidimensional table containing information on gamut mapping.

21. The computer readable storage medium of claim 20, wherein the operation of obtaining a set of color space characteristic values for a display device further comprises an operation of querying the display device.

22. The computer readable storage medium of claim 20, wherein the operation of obtaining a set of color space characteristic values for a display device further comprises an operation of accessing data on a storage device.

23. The computer readable storage medium of claim 20, wherein the operation of obtaining a set of color space characteristic values for a display device further comprises an operation of accessing data over the Internet.

24. The computer readable storage medium of claim 22, wherein the operation of obtaining a set of color space characteristic values for a display device further comprises an operation of accessing the color space characteristic values from an existing matrix profile.

25. The computer readable storage medium of claim 20, wherein the operation of building the profile further comprises an operation of augmenting an existing matrix profile to include mappings of out-of gamut colors to in-gamut colors.

26. The computer readable storage medium of claim 20, wherein the operations further comprise storing the profile on the storage device.

27. A computer readable storage medium containing instructions, which when executed by a processor device, cause operations to be performed which comprise:
   detecting a command to display content on a screen of a display device;
   retrieving a set of color space characteristic values associated with the display device;
   building a display profile having a BtoA tag based on those color space characteristic values, the BtoA tag including a multidimensional table having values for the display device to preserve a color's hue for out-of-gamut mapping for displaying the content on the screen, the multidimensional table being different from a matrix and being substantially larger in file size than a matrix-based format for the set of color space characteristic values, the multidimensional table containing information on gamut mapping;
   referencing the display profile for the display device;
   transforming the content's color values with the display profile; and
   displaying the content on the display device.

28. The computer readable storage medium of claim 27, wherein the operation of retrieving the set of color space characteristic values further comprises an operation of querying the display device.

29. The computer readable storage medium of claim 27, wherein the operation of retrieving the set of color space characteristic values for a display device further comprises an operation of accessing data on a storage device.

30. The computer readable storage medium of claim 27, wherein the operation of retrieving the set of color space characteristic values for a display device further comprises an operation of accessing data over the Internet.

31. The computer readable storage medium of claim 27, wherein the operation of retrieving the set of color space characteristic values for a display device further comprises an operation of accessing the color space characteristic values from an existing matrix profile.

32. The computer readable storage medium of claim 27, wherein the operations further comprise storing the display profile.

33. The computer readable storage medium of claim 32, wherein the operations further comprise using the stored display profile upon detecting subsequent commands to display content.

34. The computer readable storage medium of claim 27, wherein the operation of transforming the content's color values with the display profile includes an operation of transforming the content's color values from a device-independent color space to the display device's color space as defined by the display profile.

35. The computer readable storage medium of claim 27, wherein the operation of transforming the content's color values with the display profile includes an operation of transforming the content's color values from a profile connection space to the display device's color space as defined by the display profile.

36. The computer readable storage medium of claim 27, wherein the operation of transforming the content's color space values with the display profile includes an operation of transforming an out-of-gamut, with respect to the display device, color space value to an in-gamut, with respect to the display device, color space value.

37. An electronic device, comprising:
a processor;
at least one display device coupled to the processor for displaying information processed by the processor, the display device having a screen to display the information; and
a storage device encoded with computer-readable instructions, wherein the instructions when read and executed by the processor cause operations to be performed comprising:
detecting a re-calibration event;
querying the display device for a set of color space characteristic values that describe the color space of the display device;
receiving the set of color space characteristic values from the device; and
automatically building a profile for the display device using the set of color space characteristic values by converting a matrix-based format of the set of color space characteristics to a multidimensional table, the multidimensional table being different from a matrix, the multidimensional table containing more information on gamut mapping than the matrix-based format, wherein the profile comprises:
the multidimensional table encapsulating the display behavior as described by the color space characteristic values, the multidimensional table including values for the display device to preserve a color's hue for out-of-gamut mapping for displaying content on the screen; and
out-of-gamut mapping optimizations.

38. The electronic device of claim 37, wherein the multidimensional table includes a BtoA tag as described by the ICC specification, version 2.

39. The electronic device 38, wherein the BtoA tag includes a tag with 8 bit data (mft1) and 16 bit data (mft2).

40. The electronic device of claim 37, wherein the multidimensional table includes a BtoA tag as described by the ICC specification, version 4.

41. The electronic device of claim 40, wherein the BtoA tag includes a tag with a 16 bit mba tag.

42. The electronic device of claim 37, wherein the color space characteristic values include chromatisity and gamma values.

43. An electronic device, comprising:
a processor; and
a storage device encoded with computer-readable instructions, wherein the instructions when read and executed by the processor cause operations to be performed comprising:
detecting a re-calibration event;
querying a display device for a set of color space characteristic values, the display device having a screen to display content;
receiving the set of color space characteristic values from the display device; and
building a profile for the display device using the set of color space characteristic values, wherein the profile comprises a BtoA tag, the BtoA tag having a multidimensional table including values for the display device to preserve a color's hue for out-of-gamut mapping for displaying the content on the screen, the multidimensional table being different from a matrix and being substantially larger in file size than a matrix-based format for the set of color space characteristic values, the multidimensional table containing information on gamut mapping; and
storing the profile on the storage device.

44. The electronic device of claim 43, wherein the electronic device is a personal computer.

45. The electronic device of claim 43, wherein the electronic device is a set-top box.

46. The electronic device of claim 43, wherein the electronic device is a personal digital assistant (PDA).

47. The electronic device of claim 43, wherein the electronic device is a portable audio player.

48. The electronic device of claim 43, wherein the electronic device is a cell phone.

49. The electronic device of claim 43, further comprising a display device contained in a same enclosure as the processor and storage device.

50. The electronic device of claim 43, wherein the display device is enclosed separately from the processor and storage device.

51. A system comprising:
a color management system to perform color transformations from a device-independent color space to a device-dependent color space; and
a profile database for use by the color management system when performing color transformations, the profile database comprising one or more stored profiles having a multidimensional table encapsulating color responses for a display as described by color space characteristic values for the display, the display having a screen to display content, and having out-of-gamut mapping optimizations, at least one of the one or more stored profiles automatically created by converting a matrix-based format of color space characteristic values for the display device to the respective multidimensional table, the multidimensional table including values for the display to preserve a color's hue for out-of-gamut mapping for displaying the content on the screen, the multidimensional table being different from a matrix, the multidimensional table containing more information on gamut mapping than the matrix-based format.

52. The system of claim 51, wherein the color space characteristic values comprises chromaticity coordinates and one or more gamma values.

53. The system of claim 51, the stored profiles conforms to the International Color Consortium (ICC) profile specification.

54. The system of claim 51, wherein the multi-dimensional table includes a BtoA tag as described by the ICC profile specification.

55. A method of calibrating a display device, comprising:
receiving a set of color space characteristic values that describe the color space of the display device, the display device having a screen to display content, the set of color space characteristics being in matrix-based format;

determining capabilities of a computing device connected to the display device, the capabilities being different from color characteristics of the display device; and automatically building a profile specific to the determined capabilities using the set of color space characteristic values, the profile including a multidimensional table including values for the display device to preserve a color's hue for out-of-gamut mapping for displaying the content on the screen, the multidimensional table being different from the matrix-based format, the multidimensional table being different from a matrix.

56. The method of claim 55, wherein the capabilities include CPU speed.

57. The method of claim 55, wherein the capabilities include the presence of a video card.

58. The method of claim 55, wherein the capabilities include the suitability of a video card.

59. The method of claim 55, wherein the capabilities include the amount of memory on the computing device.

60. The method of claim 55, wherein building a profile includes building a profile which contains both matrix-based data and multi-dimensional table data.

* * * * *

UNITED STATES PATENT AND TRADEMARK OFFICE
CERTIFICATE OF CORRECTION

| | | |
|---|---|---|
| PATENT NO. | : 7,646,391 B1 | Page 1 of 1 |
| APPLICATION NO. | : 10/836365 | |
| DATED | : January 12, 2010 | |
| INVENTOR(S) | : David Hayward | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 604 days.

In column 1, line 60-61, delete "calorimetric" and insert -- colorimetric --, therefor.

In column 5, line 28, delete "out-of gamut" and insert -- out-of-gamut --, therefor.

In column 7, line 56, delete "calorimetric" and insert -- colorimetric --, therefor.

In column 9, line 21, delete "Color Sync" and insert -- ColorSync --, therefor.

In column 12, line 38, in claim 25, delete "out-of gamut" and insert -- out-of-gamut --, therefor.

In column 14, line 8, in claim 39, after "device" insert -- of claim --.

In column 14, line 16, in claim 42, delete "chromatisity" and insert -- chromaticity --, therefor.

Signed and Sealed this

Fourteenth Day of September, 2010

David J. Kappos
*Director of the United States Patent and Trademark Office*